(12) United States Patent
Skolaude (10) Patent No.: US 10,654,094 B2
(45) Date of Patent: May 19, 2020

(54) DEVICE AND METHOD FOR SETTING A CONNECTING ELEMENT ON A WORKPIECE

(71) Applicant: RICHARD BERGNER VERBINDUNGSTECHNIK GMBH & CO. KG, Schwabach (DE)

(72) Inventor: Andreas Skolaude, Schwabach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 10 days.

(21) Appl. No.: 16/062,452

(22) PCT Filed: Dec. 12, 2016

(86) PCT No.: PCT/EP2016/080700
§ 371 (c)(1),
(2) Date: Jun. 14, 2018

(87) PCT Pub. No.: WO2017/102668
PCT Pub. Date: Jun. 22, 2017

(65) Prior Publication Data
US 2019/0070657 A1   Mar. 7, 2019

(30) Foreign Application Priority Data

Dec. 14, 2015 (DE) .......................... 10 2015 225 160
Mar. 14, 2016 (DE) .......................... 10 2016 204 170

(51) Int. Cl.
| | | |
|---|---|---|
| B21J 15/02 | (2006.01) | |
| B21J 15/32 | (2006.01) | |
| B21J 15/36 | (2006.01) | |
| B23P 19/00 | (2006.01) | |
| B23P 19/06 | (2006.01) | |

(Continued)

(52) U.S. Cl.
CPC ............. *B21J 15/025* (2013.01); *B21J 15/10* (2013.01); *B21J 15/16* (2013.01); *B21J 15/28* (2013.01);
(Continued)

(58) Field of Classification Search
CPC . B21J 15/025; B21J 15/10; B21J 15/16; B21J 15/26; B21J 15/28; B21J 15/285;
(Continued)

(56) References Cited

U.S. PATENT DOCUMENTS 2,356,526 A  8/1944 Mayer et al.
4,831,698 A  5/1989 Muller
(Continued)

FOREIGN PATENT DOCUMENTS

DE  750791 C  9/1953
DE  3835566 A1  5/1989
(Continued)

*Primary Examiner* — Jermie E Cozart
(74) *Attorney, Agent, or Firm* — Laurence A. Greenberg; Werner H. Stemer; Ralph E. Locher (57) ABSTRACT

A device for setting a connecting element on a workpiece includes a setting unit having a setting head which is movable in a feed direction into a working position, the connecting element can be fastened on the workpiece by the setting head, and a feed unit can feed the connecting element to the setting head. The feed unit is movable in the feed direction from an initial position into an intermediate position for transferring a connecting element to the setting head. A method for setting a connecting element on a workpiece by using the device is also provided.

19 Claims, 4 Drawing Sheets

(51) Int. Cl.
  *B21J 15/28* (2006.01)
  *B21J 15/16* (2006.01)
  *B21J 15/10* (2006.01)
  *B21J 15/26* (2006.01)

(52) U.S. Cl.
  CPC ............ *B21J 15/285* (2013.01); *B21J 15/32* (2013.01); *B21J 15/36* (2013.01); *B23P 19/006* (2013.01); *B23P 19/063* (2013.01); *B21J 15/26* (2013.01); *Y10T 29/49943* (2015.01); *Y10T 29/49956* (2015.01); *Y10T 29/5343* (2015.01); *Y10T 29/5377* (2015.01)

(58) Field of Classification Search
  CPC ................ B21J 15/36; Y10T 29/49943; Y10T 29/49956; Y10T 29/5343; Y10T 29/5377
  See application file for complete search history.

(56) References Cited

U.S. PATENT DOCUMENTS

| | | |
|---|---|---|
| 5,964,393 A | 10/1999 | Feldpausch et al. |
| 9,339,899 B2 | 5/2016 | Doo et al. |
| 9,868,148 B2 | 1/2018 | Hauw |
| 2017/0209966 A1 | 7/2017 | Skolaude |
| 2018/0021844 A1 | 1/2018 | Skolaude |

FOREIGN PATENT DOCUMENTS

| | | |
|---|---|---|
| DE | 9318967 U1 | 2/1994 |
| EP | 3031548 A1 | 6/2016 |
| WO | 9601161 A1 | 1/1996 |
| WO | 2012063022 A2 | 5/2012 |
| WO | 2016055478 A1 | 4/2016 |
| WO | 2016156359 A2 | 10/2016 |

DEVICE AND METHOD FOR SETTING A CONNECTING ELEMENT ON A WORKPIECE

BACKGROUND OF THE INVENTION

Field of the Invention

The invention relates to a device and a method for setting connecting elements on a workpiece.

Examples of connecting elements are press-in elements such as press-in nuts, press-in bolts, press-in screws or rivets, which are pressed into a workpiece (part), usually a metal sheet, by applying a predetermined press-in force. Connecting elements may also be other screws or rivets or bolts. Connecting elements are attached to the workpiece in automated processes or even in semi-automated processes using a setting unit. This is usually formed as a press-in unit, having a hydraulically/pneumatically/electrically movable tappet that exerts a press-in force on the connecting element in the setting direction. WO 2016/156359 A2 discloses an electrical direct drive for a setting unit.

The connecting elements are usually fed to a setting head of the setting unit by means of a feed unit. A setting unit identified as a feed block is disclosed in WO 2016/055478 A1.

In many applications, a maximum possible cycle rate is important for attaching the connecting elements to the workpiece. This applies in particular to the motor vehicle industry.

For automated setting processing machines, industrial robots in particular are often used, in which the setting unit is arranged on a robot hand that is freely movable in space. In particular, in motor vehicles, the connecting elements are often arranged on complex body components, and the attachment points are partially difficult to access due to a complex component geometry for the setting unit.

BRIEF SUMMARY OF THE INVENTION

Against this background, the objective of the invention is to provide a device and a method for setting connecting elements on a workpiece, wherein a short cycle time is achieved, in particular in applications in the motor vehicle industry.

The objective is achieved by a device for performing a setting process for setting a connecting element on a workpiece, in which a control device controls the operation of the setting process, a setting unit has a setting head movable into a working position in a feed direction, the setting head can fasten the connecting element on the workpiece, a feed unit feeds the connecting element to the setting head, and the feed unit is movable in the feed direction from a starting position to an intermediate position for transferring a connecting element to the setting head. Preferred developments are contained in the dependent claims. The objective is further achieved by a method for setting a connecting element on a workpiece by using a device according to the invention. The refinements and advantages referred to with regard to the device apply analogously to the method.

The device comprises, to begin with, a setting unit with a setting head, wherein at least the setting head, and preferably the entire setting unit, may move towards the workpiece into a working position in a feed direction. In the working position, setting takes place, i.e. the connecting element is connected to the workpiece. For this purpose, the connecting element is fixed, in particular pressed, onto the workpiece by means of the setting head. The device further comprises a feed unit by means of which a respective connecting element is fed to the setting head. After each work cycle, the feed unit recurrently transfers a connecting element to the setting head. Each respective work cycle comprises the feed movement of the setting unit to the workpiece, the actual setting process, and a return movement of the setting unit to a transfer position for receiving the next connecting element.

The setting process or sequence of a plurality of setting processes/working cycles is thus suitably controlled by a control device.

It is particularly important that the feed unit is also movable in the feed direction, i.e. in the direction of the workpiece from a starting position to an intermediate position, and that in the intermediate position, a respective connecting element is fed to the setting head.

Unlike conventional arrangements, the feed unit is accordingly no longer arranged to be stationary, but may move in the direction of the workpiece together with the setting unit.

Expediently, the setting head and feed unit may move independently of one another in the direction of the working position, so that an individual intermediate position may be adopted for the feed unit, independent of the respective position of the setting unit.

In this way, the feed unit may be individually positioned in an intermediate position close to the workpiece. The required return movement of the setting unit for receiving another connecting element is thus reduced after the actual setting process. This conserves travel time and thus results in an overall lower cycle time for a particular work cycle.

Preferably, the feed unit is mounted on a carrier in such a way as to be linearly displaceable. Appropriate adjusting mechanisms are furnished for this purpose. Examples include reciprocating pistons, racks, telescoping rods, etc.

In a particularly expedient embodiment, an intermediate position is in each case freely adjustable; in other words, the transfer of the connecting elements may preferably take place in different positions, either discrete positions or any intermediate positions. The intermediate position may therefore be freely selected depending on the particular application.

Expediently, the intermediate position is adopted based on the geometry of the workpiece, and preferably in such a way that the shortest possible travel path (return path) is required between two successive setting processes for the setting unit.

Accordingly, therefore, the control device for a respective setting process provides an intermediate position as optimized as possible, to which the feed unit moves.

When the intermediate position changes between two setting positions, the setting unit moves into the new intermediate position, preferably while the setting unit is performing the setting process, so that as short a travel path as possible is achieved for the setting unit in the subsequent cycle.

Depending on the component geometry, therefore, the entire setting unit is positioned as optimally as possible. For example, in sections of the part having a flat, uniform structure into which a plurality of connecting elements must be introduced, the setting unit is brought as close as possible to the workpiece. Conversely, in complex geometries with limited space, it may be necessary for the feed unit to be positioned in a more retracted position.

Overall, in an expedient embodiment, a dynamic retraction of the intermediate position in successive setting processes is provided.

As an alternative to continuous retraction between two successive setting processes, the feed unit may remain in the same intermediate position over a plurality of setting processes.

Feeding the connecting element is usually done by means of a feed punch or generally by means of a sliding element, via which the connecting element is fed to the setting head, in particular in a transverse direction perpendicular to the feed direction.

The feed unit is additionally connected to a feed device for the connecting elements. This is in particular a feed tube, via which the connecting elements of the feed unit are fed, in particular pneumatically. Alternatively or additionally, a magazine or even a conveyor for storing a plurality of connecting elements may be formed within the feed unit. In the case of storage using a magazine, the additional connection via a feed tube is not strictly necessary.

Preferably, the setting unit and feed unit are further held on a shared carrier. A retracted, particularly upper, position defines the starting position in this case.

The carrier is expediently a curved carrier, in particular a C-shaped carrier. The setting unit and feed unit are in particular attached to an upper curved part, while a holder for the workpiece is arranged on a lower curved part. The lower curved part therefore serves as a support for absorbing the setting forces.

According to a preferred embodiment, which is considered to be an independent second inventive aspect of the invention, the device has both a movable setting unit and a die that has at least one die punch that is movable counter to the feed direction. The die punch is controlled within an inner channel of a base body of the die, by means of a drive mechanism. The drive and the feed movement of the setting unit, and that of the second drive, are in particular coordinated in this case. The die punch is generally used as a support when setting the connecting element and/or establishing a positive connection with the workpiece by at least partially reshaping the connecting element using the die punch.

Expediently, the die punch in particular adopts two positions for a multi-stage setting process. In this case, the setting steps or stages of the setting process take place in a respective position.

Expediently, a piercing process is the first step and a reshaping process is the second step. In the piercing process, a hole is punched in the workpiece, into which the connecting element is then pressed. The hole punching then takes place with the connecting element itself. Accordingly, the connecting element in an expedient embodiment is a self-piercing connecting element, in particular a pierce nut or self-pierce rivet, and especially a pierced half-tubular rivet. Alternatively, the setting unit has a die punch, by means of which the holes are punched. Next, in the second step, a reshaping area of the connecting element is reshaped. The two positions are a retracted (punching) position occupied by the die punch during the piercing process and a forward (reshaping) position where the die punch contributes to the reshaping.

The particular advantage of decoupling these two setting steps is the fact that different forces are required in these two setting steps, both for punching and for reshaping. Due to the two working positions of the die and the movability of the die punch, these two setting steps may be suitably carried out in a single setting process. In this case, higher forces usually occur in the second setting step, the reshaping process.

In the reshaping process, a part of the connecting element, in particular a collar, is reshaped, and in particular radially widened or flanged. This reshaping serves to establish a positive axial fit of the connecting element to the workpiece. The collar engages in particular behind the underside of a part.

According to a first preferred variant of the setting process, the setting head moves against the workpiece and presses the connecting element to form the positive connection with the workpiece against the die punch. The required reshaping force is therefore applied by the feed movement of the setting head. The die punch is stationary and serves as a support.

Preferably, in this case, first a hole is punched into the workpiece by means of the connecting element, then the connecting element is moved back slightly, then the die punch is moved into its forward position, and then the setting head presses the connecting element against the die punch for reshaping.

According to a second alternative variant of the setting process, the setting head moves to set the connecting element against the workpiece and inserts the connecting element into the workpiece. Subsequently, the die punch moves against the connecting element to reshape the connecting element and establish the positive connection between the connecting element and the workpiece. In this variant, therefore, the required reshaping force is applied by the feed movement of the die punch. The setting head, in particular a stamp, by means of which the connecting element is held, in this case is stationary and serves as a support.

The drive mechanism for the die punch is generally designed to absorb or apply the required reshaping force. The drive mechanism for this purpose preferably has a mechanical linkage, which in particular has a toggle mechanism, especially a toggle lever. This embodiment is particularly suitable for both of the aforementioned variants, because a suitable deflection or absorption of the forces takes place via the toggle lever mechanism, so that generally a drive is not required for the adjusting movement of the die punch. In general, it is further provided that the linkage is also supported on the carrier, so that at least a part of the forces are directed into the carrier.

Preferably, the linkage is a self-locking linkage. This has the particular advantage that high forces may be absorbed by the locking. Despite the adjustability of the die punch and the high (reshaping) forces, the drive required for the adjustment drive may be made small and compact, because at least a majority of the applied setting forces are introduced directly into the carrier via the linkage in the second setting step, and are not transmitted to the drive.

The linkage is further connected to the drive via an actuating rod, which is directed in particular backward, laterally to the feed direction. As a result, the drive is arranged at a distance from the die. The space required for the device, in particular for the carrier in the region of the die, is accordingly kept low. This is particularly important in setting processes in confined working environments, for example in motor vehicles.

The actuating rod preferably runs inside the carrier in a space-saving fashion, and the carrier is in particular designed as a curved carrier. The die in this case is arranged on a lower curved part. In addition, preferably the drive is also arranged within the carrier, for example in a recess or opening.

For the second drive for adjusting the die punch, preferably an electric drive is used. Alternatively, pneumatic or hydraulic drives may be used. In addition, for the (first) drive for the setting unit, preferably also an electric drive or alternatively a pneumatic or hydraulic drive is used.

Overall, therefore, the device is characterized by two drives, namely one for the setting unit and one for the die punch, which respectively cause a defined movement that is specially controlled.

The die generally has a preferably ring-shaped base body, within which the die punch is arranged so as to be movable in the vertical direction. In addition, in a preferred development the base body has in particular a lateral opening for disposing of a punched slug, which is obtained in the punching step.

For reliable disposal, the die also has a flap that may be adjusted between an open position and a closed position. In the open position, the side opening is open.

Preferably, the flap in the open position serves simultaneously as a ramp on which the punched slug is moved away to the opening.

Further, the flap is expediently actuated automatically by a movement of the die punch, in particular by the punch itself. The flap is preferably a rotary flap.

The entire device described herein is optionally attached to a stationary processing machine, but preferably it is attached to a manipulator that is freely movable in space, in particular a multi-axis industrial robot. For this purpose, in particular, the carrier is attached to a manipulator hand (robot hand), so that the entire device is virtually freely movable in space and may move to the desired processing position on the workpiece at which a respective connecting element is to be set.

It is generally of particular importance that in one work cycle of the device, both a punching step and the actual setting step takes place. An overall short processing time for a workpiece is achieved in this way.

BRIEF DESCRIPTION OF THE SEVERAL VIEWS OF THE DRAWING

The individual aspects of the device are explained below with reference to the drawings. The drawings show the following, in partially simplified representations.

DESCRIPTION OF THE INVENTION

In the drawings, like-acting parts are assigned the same reference numerals.

The device 2 shown in the drawings is used in particular to carry out a multi-stage setting process in which a connecting element 4 is placed on a workpiece 6, in particular a metal sheet. The connecting element 4 is, for example, a press-in nut, a press-in bolt (screw) or alternatively a rivet. The connecting element 4 is, for example, a self-piercing connecting element, such as a self-piercing nut or a self-piercing rivet.

The device 2 has a setting unit 8, by means of which the actual setting process, i.e. the pressing in of the connecting element 4, takes place in the workpiece 6. The device 2 also has a feed unit 10, which is designed for the particularly lateral feeding of the connecting element 4 to the setting unit 8. The setting unit 8 and feed unit 10 are arranged on a carrier 12. This is configured—as shown in the exemplary embodiment—preferably in the manner of a curved, in particular C-shaped carrier 12. This carrier has an upper curved part 12A and a lower curved part 12B.

The device 2 further comprises a first drive 14, which is in particular an electric motor drive. This first drive 14 is associated with a tappet 16, which in particular may be moved by electric motor in a feed direction 18. The setting unit 8 is attached at the front end of the tappet 16. This unit is thus offset in the feed direction 18 by means of the tappet 16. The first drive 14 is fixed to the carrier 12, in particular to the front end of the upper curved part 12A.

The device 2 further comprises a holder 20, furnished for supporting or holding the workpiece 6. In operation, the workpiece 6 rests on this holder 20. The holder 20 forms a multi-part die 22, the detailed structure of which is explained in greater detail in particular in connection with FIGS. 6 and 7. The holder 20 or die 22 are arranged on the lower curved part 12B opposite the setting unit 8.

Figure 6A:
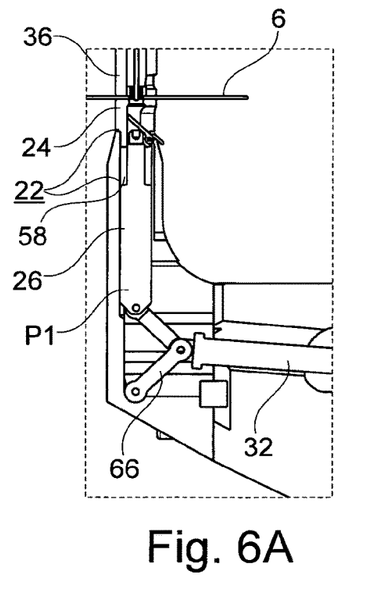
FIG. 6A shows a partial enlarged view in the manner of a cross-section through the device in the region of a die with an overlying workpiece formed as a metal sheet, which is pressed by the setting unit against the die and with an adjustable die punch, which is in a retracted position during a piercing process.
Figure 6B:
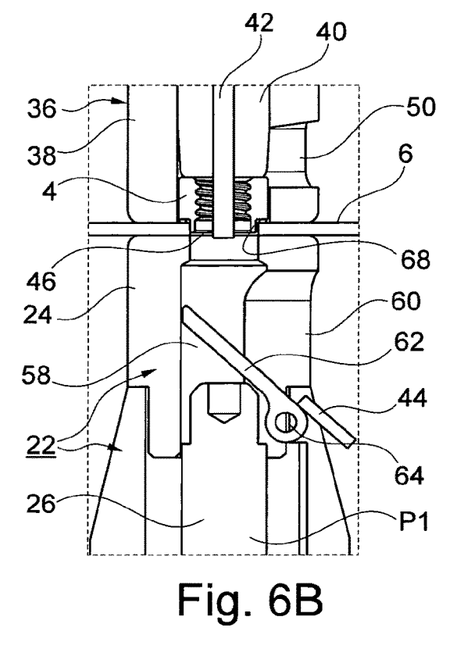
FIG. 6B shows an enlarged view of FIG. 6A in the region of the die for illustrating the discharge of a punched slug via a lateral opening in the die.
Figure 7A:
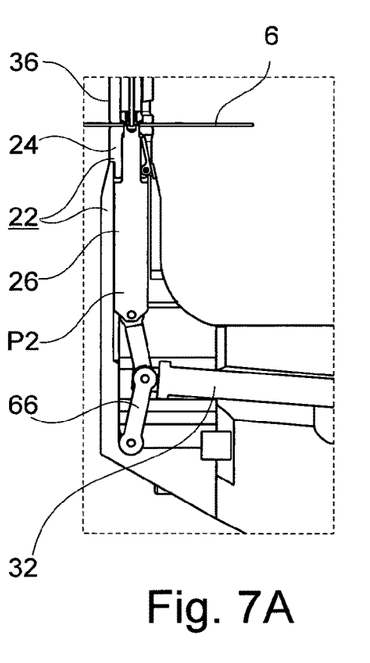
FIG. 7A shows an illustration similar to FIG. 6A, wherein after the piercing process has taken place, the die punch is in a forward position.
Figure 7B:
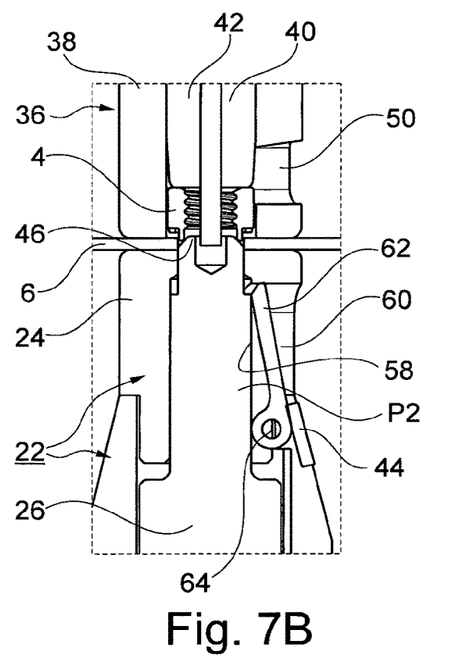
FIG. 7B shows an enlarged view of FIG. 7A, in which the connecting element is still in a pre-assembly position before a reshaping process.
Figure 7C:
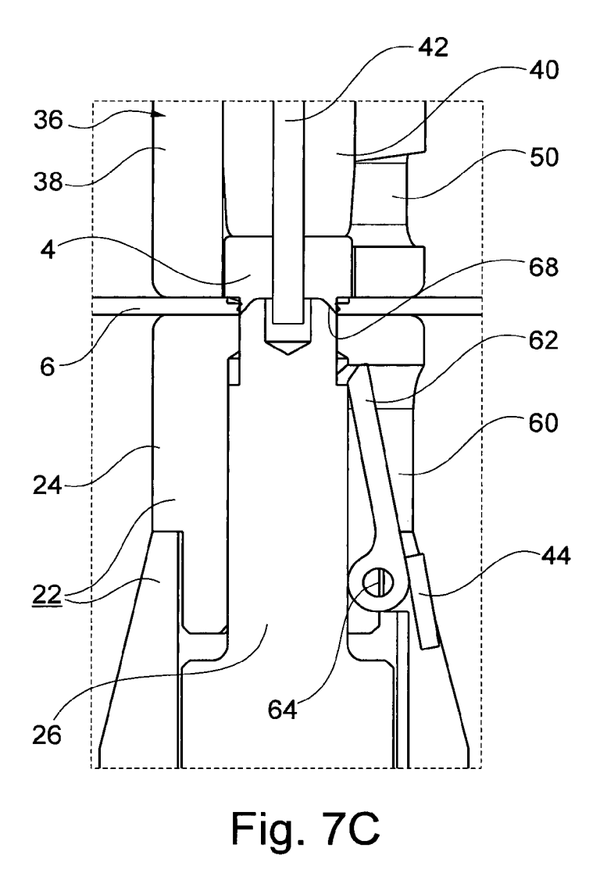
FIG. 7C shows an enlarged view in the region of the die following a reshaping process, wherein a collar of the connecting element has been reshaped for a positive connection with the workpiece.

The multi-part die 22 generally has a base body 24 and a die punch 26 that is adjustable within the base body 24 (see also FIGS. 6 and 7). A drive mechanism 28 is furnished for adjusting the die punch 26. This comprises a second drive 30, which is also configured in particular as an electric motor. The drive mechanism 28 further comprises an actuating rod 32 that may be displaced in its longitudinal direction by means of the second drive 30. At its front end, it is connected to a linkage 34, which in turn is connected to the die punch 26.

The setting unit 8 generally has a setting head 36. This setting head in turn has at its front end a hold-down 38 and a movable punch arranged therein, which is configured in particular as a punch sleeve 40. Preferably, an ejector pin 42 is additionally arranged within the punch sleeve 40, which serves for ejecting a punched slug 44 (see again FIGS. 6 and 7). The punch sleeve 40 generally serves to guide the connecting element 4 to the workpiece 6. In addition, the punch sleeve 40 is formed in a preferred embodiment as a piercing sleeve, so that a piercing process may be performed for producing a hole 46 in the workpiece 6.

The feed unit 10 is attached to the carrier 12 by means of a linear guide 48 and may move to different positions in the feed direction 18. For the transfer of the connecting element 4 to the setting head 36, this setting head has a lateral feed opening 50 (see, in particular, FIG. 6B). The feed is thus generally lateral, and approximately perpendicular to the feed direction 18. For this purpose, the feed unit 10 has, in particular, a feed punch 52 or slide that may be extended in the transverse direction. This feed punch or slide is optionally operated pneumatically, hydraulically and in particular by an electric motor.

Feeding the connecting elements 4 to the feed unit 10 takes place in the exemplary embodiment by means of a feed tube 54.

The setting process is generally controlled by means of a control device 56. This control device controls in particular the first drive 14, the second drive 30, and the adjustment of the feed unit 10 along the linear guide 48 (which preferably also takes place by means of an electric motor drive) and, in addition, the operation of the feed punch 52.

Figure 1:
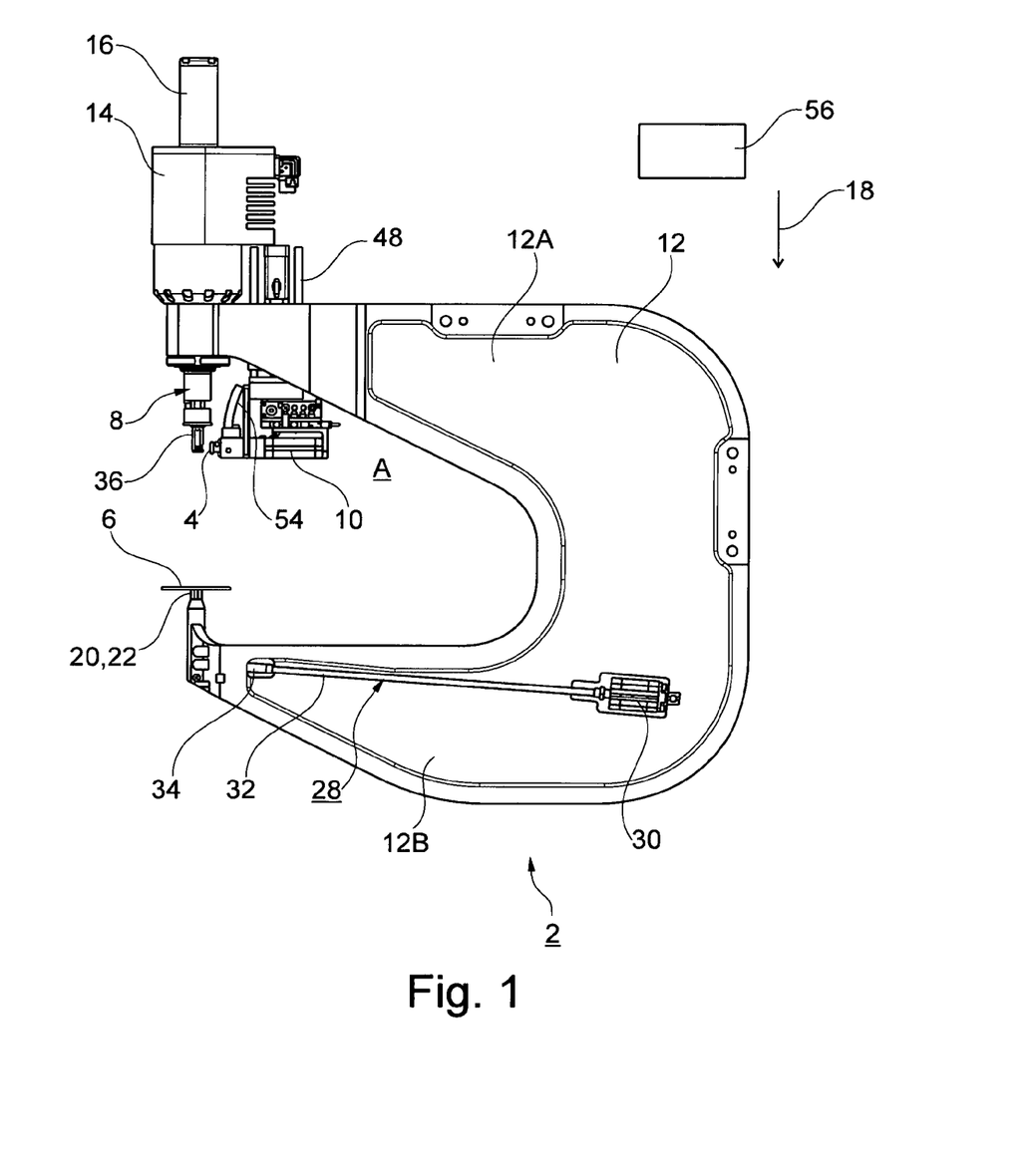
FIG. 1 shows a side view of a device for carrying out a setting process for setting a connecting element, comprising a setting unit and a feed unit that are in a starting position.
Figure 2:
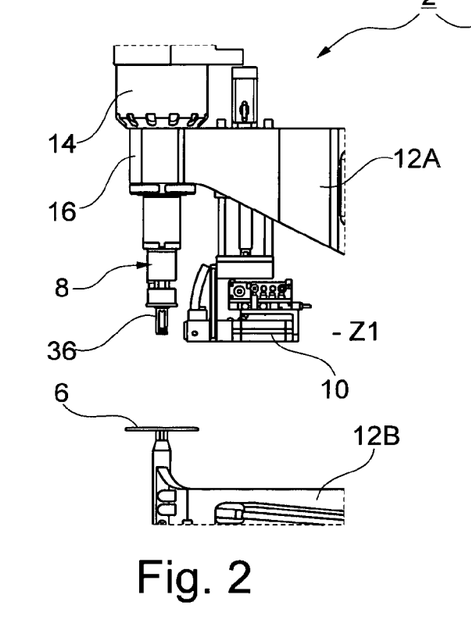
FIG. 2 shows a partial enlarged view of the device according to FIG. 1, wherein the setting unit and feed unit are in a first intermediate position.
Figure 3:
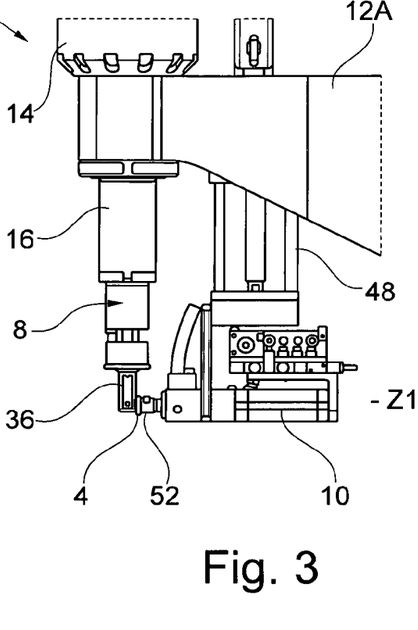
FIG. 3 shows an enlarged partial view of FIG. 2, showing an enlarged view of a transfer of a connecting element from the feed unit to the setting unit.
Figure 4:
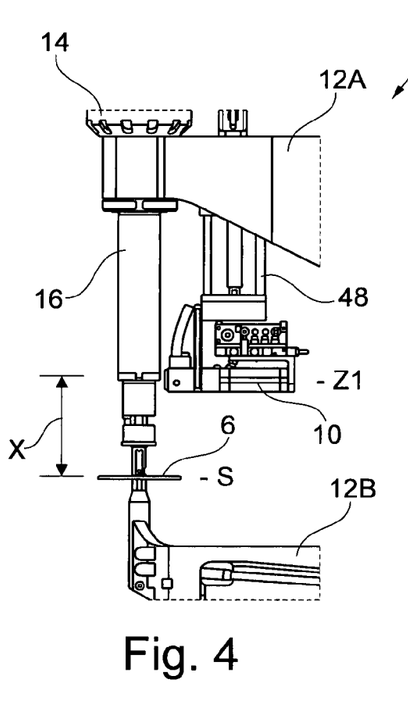
FIG. 4 shows a partial enlarged view of the device according to FIG. 1, in which the setting unit is in a setting position for carrying out the setting process and the feed unit is in the first intermediate position.
Figure 5:
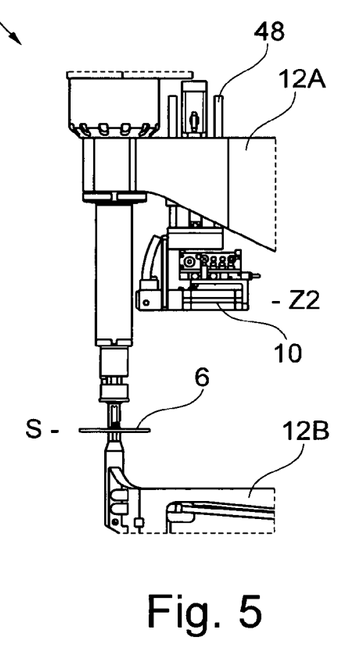
FIG. 5 shows a partial enlarged view of the device according to FIG. 1, in which, starting from the situation according to FIG. 4, the feed unit is moved to a second intermediate position, while the setting unit remains in the setting position.

A first concept relates to the method of the feed unit 10 together with the setting unit 8 in the feed direction 18, in particular also the dynamic retraction of the feed unit 10 through a plurality of consecutive settling operations (working cycles). This first aspect will be explained in greater detail in connection with FIGS. 1 to 5:

FIG. 1 shows the feed unit 10 and the setting unit 8 in a completely retracted starting position A. Starting from this starting position A, the feed unit 10 may move into any intermediate position between the starting position A and a setting position S of the setting unit 8. FIG. 2 shows a first intermediate position Z1 and FIG. 5 shows a second intermediate position Z2. At the beginning of processing the workpiece 6, in which in particular a plurality of connecting elements 4 are fastened successively in the course of several setting processes, the feed unit 10 moves first of all from the starting position A shown in FIG. 1, preferably together with the setting unit 8, to the first intermediate position Z1 shown in FIG. 2. In this position, the connecting element 4 is transferred from the feed unit 10 to the setting head 36. For this purpose, the feed punch 52 moves out laterally to convey the connecting element 4 laterally to the setting head 36. After successful transfer, only the setting unit 8 moves to the setting position S, shown in FIG. 4. In this setting position S, the actual setting step takes place for establishing the positive connection of the connecting element 4 with the workpiece 6.

After each setting process, a renewed conveyance of a further connecting element 4 to the setting head 36 is required. Due to the axial adjustment in the feed direction 18, a required travel path x, which the setting unit 8 must cover, is optimized in such a way that it is as short as possible under the given circumstances. As a result, high cycle rates may be achieved.

In the drawings, the workpiece 6 is shown as a simple flat metal sheet. With a simple geometry of this kind, the feed unit 10 would adopt an intermediate position close to the setting position S. Typically, the connecting elements 4, especially for example in the case of motor vehicle parts, must be incorporated into complex workpiece geometries in which accessibility is limited. Typically, the carrier 12 is attached for example to a robot hand, and is moved relative to the workpiece 6. In this movement, contact, for example, of the feed unit 10 with the workpiece 6 should be avoided. The feed unit 10 should therefore be brought to a suitable retracted intermediate position. In the course of workpiece processing 6 (i.e. in the course of the plurality of setting processes), it may be necessary for the feed unit 10 to be moved to different intermediate positions. By way of example, it is shown in FIG. 5 that after the setting process for setting the first connecting element according to FIG. 4, the feed unit 10 moves into the second intermediate position Z2, which is further back. This already has taken place, for example, during the previous setting process. Alternatively, however, a return may occur during the return movement of the setting unit 8.

With regard to a maximum possible cycle rate, it is also generally provided that, for the renewed transfer of an additional connecting element 4 for a subsequent setting process, the feed punch 52 with a connecting element 4 held thereon moves into a pre-position in which the feed punch 52 is partially extended.

After the setting process, the setting unit 8 generally moves back to the intermediate position at which the feed unit 10 is located, receives the next connecting element 4, then moves back to the setting position S and inserts the next connecting element 4 into the workpiece 6.

Overall, this cycle, "receive connecting element 4—perform setting process at setting position S—receive next connecting element 4" is repeatedly performed as a work cycle, until for example, the workpiece has been processed, i.e. furnished with the intended number of connecting elements. Within such a work cycle, in the case of a dynamic retraction of the feed unit 10, the step of "moving the feed unit to a further intermediate position" is additionally provided. In the case of a plurality of such work cycles, a dynamic retraction of the feed unit 10 then takes place in this case.

A second essential aspect relates to the movability of the die punch 26 within the base body 24. This will be explained in greater detail in connection with FIGS. 6 and 7:

The setting process is in particular a multi-stage setting process, composed of a piercing process and a reshaping process for establishing the positive connection of the connecting element 4 with a hole edge of the hole 46 of the workpiece 6.

From the enlarged illustrations in FIGS. 6B, 7B and 7C, the structure of the setting head 36 may once again be seen, with the hold-down 38, the punch sleeve 40 guided therein, and the ejector pin 42 guided therein in turn. These three elements are suitably guided, either coupled together or independently of each other, and adopt different axial positions. As may further be seen from this illustration, the hold-down 38 has the lateral feed opening 50 for the lateral feeding of the connecting element 4.

In the setting process, the workpiece 6 is generally pressed against the holder 20 or the die 22 by means of the hold-down 38. The workpiece 6 therefore comes to rest on an upper side of the die 22, more precisely on an upper side of the base body 24. From the drawings, the structure of the die 22 may be seen further. According to this, the base body 24 has an inner channel 58, within which the die punch 26 is arranged to be adjustable counter to or in the feed direction 18.

The base body 24 also has a lateral opening 60, which may be closed by means of a flap 62. The flap 62 in the exemplary embodiment is a rotary flap that is arranged with one end rotatable about a swivel joint 64. It may be shifted from a position that releases the opening 60 (FIG. 6B) into a position that closes the opening 60 (FIG. 7B), and in the latter case it is oriented substantially vertically. In the open position, the flap rests, in particular, with one end against a wall region of the inner channel 58 opposite the opening 60 and, in particular, is oriented obliquely with respect to the feed direction 18. As a result, it virtually defines a slope or chute (ramp) via which the punched slug 44 may automatically slide out via the lateral opening 60.

Actuation of the flap 62 is carried out automatically by means of the die punch 26.

This die punch is generally arranged so that it may move between a retracted piercing position P1, as shown in FIGS. 6A, 6B, and a front reshaping position P2, as shown in FIGS. 7A, 7B and 7C.

The adjustment takes place by means of the drive mechanism 28. In particular, the drive mechanism 28 has a mechanical linkage 66, which is designed in particular as a toggle mechanism and especially as a toggle lever. The mechanical linkage 66 is actuated in particular by means of the actuating rod 32, wherein the adjusting movement of the actuating rod 32, oriented substantially transversely to the feed direction 18, is converted into a vertical movement in or counter to the feed direction 18.

A particular advantage of this drive mechanism 28 with the mechanical linkage 66 is that the high forces that arise during the reshaping process may be reliably absorbed via the linkage 66 without the second drive 30 being excessively loaded. In the ideal case, the forces are not transmitted to the second drive 30. In this embodiment, therefore, the linkage 66 is locked in place. It is specially a self-locking linkage 66, for example, as a result of the toggle lever design.

The linkage 66 generally acts on a lower foot area of the die punch 26 and is hinged to this foot area. In the exemplary embodiment with the toggle lever a total of three joints are furnished, first to the die punch 26, second to the actuating rod 32 and finally to the carrier 12 on which the toggle lever is supported.

The die punch 26 typically has a conical end on its end face and serves as a support and for reshaping a portion of the connecting element 4 to establish the desired positive connection.

In the exemplary embodiment, a nut is shown as a connecting element 4, which has on its underside a reshaping collar 68, also referred to as a flared collar. This reshaping collar 68 is bent outward during the reshaping process so that a positive rear grip is established with the workpiece 6.

In the exemplary embodiment, in particular a self-piercing nut is furnished that thus initially punches a hole 46 in itself before the reshaping process takes place.

As part of the multi-stage setting process, the hole-punching process is generally carried out first. This is done either by means of the self-piercing connecting element 4 or the punch sleeve 40, which in this case is formed as a piercing sleeve.

In the variant with the self-piercing nut, the nut is pressed against and into the workpiece 6 using the punch sleeve 40 in the first stage of the setting process, so that the reshaping collar 68, which is also configured in this case as a punch collar, penetrates the workpiece 6 and the slug 44 is punched out. In this piercing process, the die punch 26 is arranged in the retracted piercing position P1 shown in FIGS. 6A, 6B. This also applies to the case that the piercing process uses the punch sleeve 40.

There are generally two different variants for the subsequent reshaping process:

According to a first variant, the connecting element 4 is moved against the die punch 26, which in this case is fixed, by means of the setting head 36, so as to reshape the reshaping collar 68. In this first variant, with respect to FIG. 6B, initially at least a slight resetting of the connecting element 4 is required. The punch sleeve 40 thus moves back a section. Next, the die punch 26 moves to the forward reshaping position P2 (FIGS. 7A, 7B) and penetrates into the pre-punched hole 46 with its end face. In the subsequent reshaping step, the connecting element 4 is then pressed against the die punch 26, as shown in FIG. 7C. In this embodiment, the reshaping forces acting in the axial direction are at least largely, or even completely, absorbed by the in particular self-locking mechanical linkage 66, relieving the second drive 30 of these reshaping forces.

In the second variant, a reverse movement process is provided, according to which, starting from the position shown in FIG. 6B, the connecting element remains in the already pierced hole 46 and is held in this position by means of the setting head 36. Subsequently, the die punch 26 moves forward into the reshaping position P2. The reshaping collar 68 then reshaped (radially expanded).

In this second variant as well, the reshaping forces that will be absorbed by the second drive 30 are kept low. This is done in particular due to the special design of the linkage 66, which is generally also supported on the carrier 12 by means of at least an articulated arm, so that at least a part of the reshaping forces is redirected directly into the carrier 12. Finally, a suitable lever is created by the special toggle lever mechanism, so that the force exerted by the second drive is amplified according to the principles of leverage.

The presently described individual advantageous embodiments and different aspects may be combined with one another in any combination, and are not limited to the combinations shown in the drawings.

LIST OF REFERENCE SIGNS

2 Device
4 Connecting element
6 Workpiece
8 Setting unit
10 Feed unit
12 Carrier
12A Upper curved part
12B Lower curved part
14 First drive
16 Tappet
18 Feed direction
20 Holder
22 Die
24 Base body
26 Die punch
28 Drive mechanism
30 Second drive
32 Actuating rod
34 Linkage
36 Setting head
38 Hold-down
40 Punch sleeve
42 Ejector pin
44 Punched slug
46 Hole
48 Linear guide
50 Lateral feed opening
52 Feed punch
54 Feed tube 56 Control device
58 Inner channel
60 Lateral opening
62 Flap
64 Swivel joint
66 Mechanical linkage
68 Reshaping collar
A Starting position
P1 Piercing position
P2 Reshaping position
S Setting position
Z Intermediate position
Z1 First intermediate position
Z2 Second intermediate position
x Travel path

The invention claimed is:

1. A device for performing a setting process for setting a connecting element on a workpiece, the device comprising:
   a control device controlling operation of the setting process;
   a setting unit having a setting head being movable in a feed direction into a working position, said setting head being configured to fasten the connecting element on the workpiece; and
   a feed unit for feeding the connecting element to said setting head, said feed unit being movable in said feed direction from a starting position to a freely adjustable intermediate position for permitting a transfer of the connecting element to said setting head at different positions between said starting position and said working position.

2. The device according to claim 1, wherein said setting head and said feed unit are movable independently of one another toward said working position.

3. The device according to claim 1, wherein said setting head and said feed unit are movable parallel to one another.

4. The device according to claim 1, which further comprises a carrier on which said feed unit is mounted for linear displacement.

5. The device according to claim 1, wherein said control device is configured to adapt said intermediate position based on a geometry of the workpiece.

6. The device according to claim 1, wherein said control device is configured to select said intermediate position in such a way that a travel path of said setting unit between two consecutive setting processes is optimized for a geometry of the workpiece.

7. The device according to claim 1, wherein said control device is configured to select said intermediate position in such a way that said intermediate position is retracted dynamically during successive setting processes and optionally as a function of a geometry of the workpiece.

8. The device according to claim 1, wherein said control device is configured in such a way that said feed unit remains in said intermediate position for a plurality of setting processes.

9. The device according to claim 1, wherein said feed unit is configured to feed the connecting element to said setting head in a direction transverse to said feed direction.

10. The device according to claim 1, wherein said feed unit has at least one of a magazine for storing a plurality of connecting elements or a connection directly or through a feed tube to a feed device for the connecting elements.

11. The device according to claim 1, which further comprises a carrier on which said setting unit and said feed unit are both disposed.

12. The device according to claim 11, wherein said carrier is curved or C-shaped and has an upper curved part and a lower curved part, said setting unit and said feed unit are fastened to said upper curved part, and a holder for the workpiece is disposed on said lower curved part.

13. The device according to claim 1, which further comprises:
   a die against which said setting head is moveable in said feed direction, said die having a base body;
   a die punch displaceable in said base body; and
   a drive mechanism adjustably controlling said die punch counter to said feed direction, said drive mechanism:
   causing said die punch to serve during operation as a support for setting the connecting element, or
   causing said die punch to reshape the connecting element during operation to establish a form-locking connection with the workpiece.

14. A device for carrying out a setting process for setting a connecting element on a workpiece, the device comprising:
   a die having a base body and a die punch displaceably disposed in said base body;
   a setting unit including a setting head being movable against said die toward the workpiece in a feed direction;
   said die punch serving during operation as a support for at least one of setting the connecting element or bringing about a reshaping of the connecting element to establish a form-locking connection between the connecting element and the workpiece;
   said die punch being moveable to a forward position and a retracted position for a multi-stage setting process;
   a drive mechanism for adjusting said die punch in a controlled manner counter to said feed direction; and
   a control device controlling operation of the setting process, said control device being configured to move said die punch during operation to said forward and said retracted positions;
   said control device being configured to carry out a first variant of the setting process in such a way that said setting head moves against the workpiece for setting the connecting element and said setting head presses the connecting element against said die punch for reshaping the connecting element and establishing the form-locking connection between the connecting element and the workpiece; and
   said control device being configured to control the setting process in such a way that a hole is first punched into the workpiece by the connecting element, then the connecting element is moved back, then said die punch is moved to said forward position, and then said setting head presses the connecting element against said die punch to reshape the connecting element.

15. The device according to claim 14, wherein said control device for controlling the setting process is configured to carry out a piercing process in a first step of the setting process.

16. The device according to claim 14, wherein said control device is configured to carry out a second variant of the setting process in such a way that:
   said setting head moves against the workpiece and the connecting element is inserted into the workpiece for setting the connecting element, and
   then said die punch is moved against the connecting element for reshaping the connecting element and establishing the form-locking connection between the connecting element and the workpiece.

17. The device according to claim 14, wherein said drive mechanism has a self-locking linkage or a toggle mechanism for adjusting said die punch.

18. The device according to claim 14, which further comprises:
   a curved carrier having a lower curved part;
   said die being disposed on said lower curved part;
   said drive mechanism being disposed at least partially inside said carrier; and
   said drive mechanism having a drive and an actuating rod extending laterally relative to said feed direction.

19. The device according to claim 14, wherein:
   said base body has an inner channel, said die punch is movable in said inner channel;
   said base body has a lateral opening connected to said inner channel for disposing of a punched slug;
   a flap is configured for closing said opening; and
   said flap is automatically shifted from a closed to an open position by a movement of said die punch.

* * * * *